United States Patent
Gallichan et al.

[19]

[11] Patent Number: 5,826,836
[45] Date of Patent: Oct. 27, 1998

[54] SELF-ALIGNED RETAINING CLIP FOR AUTOMOTIVE COMPONENTS

[75] Inventors: Kevin Gallichan, London; Reginald Cook, Essez, both of United Kingdom

[73] Assignee: Ford Global Technologies, Inc., Dearborn, Mich.

[21] Appl. No.: 801,233

[22] Filed: Feb. 19, 1997

[30] Foreign Application Priority Data

Feb. 20, 1996 [GB] United Kingdom .................. 9603500

[51] Int. Cl.⁶ ......................................... G12B 9/00
[52] U.S. Cl. ...................... 248/27.3; 248/231.9
[58] Field of Search ................. 248/27.3, 27.1, 248/544, 558, 231.9; 312/7.1, 242, 245; 455/345, 90, 347; 361/814, 752, 679

[56] References Cited

U.S. PATENT DOCUMENTS

| | | | |
|---|---|---|---|
| 3,028,137 | 4/1962 | Houplain | 248/27.1 X |
| 3,210,457 | 10/1965 | Hancock et al. | 248/27.3 X |
| 3,318,558 | 5/1967 | Buttriss | 248/27.3 |
| 3,415,472 | 12/1968 | Vodinh | 248/27.3 |
| 3,613,177 | 10/1971 | Davis | 248/27.3 X |
| 4,524,933 | 6/1985 | Rouws | 248/27.3 |
| 4,550,944 | 11/1985 | Simon et al. | 248/27.3 X |
| 4,572,465 | 2/1986 | Rasca | 248/27.1 |
| 4,577,818 | 3/1986 | Clarisse | 248/27.3 |
| 4,993,668 | 2/1991 | Inamura | 248/27.3 |
| 5,366,186 | 11/1994 | Weyeneth | 248/27.3 |
| 5,383,098 | 1/1995 | Ma et al. | 361/752 X |

FOREIGN PATENT DOCUMENTS 0-006-183-A1   6/1979   European Pat. Off. .

Primary Examiner—Leslie A. Braun
Assistant Examiner—Stephen S. Wentsler
Attorney, Agent, or Firm—Mark Mollon

[57] ABSTRACT

The present invention relates to a retaining clip, and in particular to a clip that may be used to mount a component 1 such as a radio through an aperture in a motor vehicle dashboard 54. A spring clip 75 has a base 70 with screw 51 for affixing the clip to a side 2 of the component 1. A ramp section 40 extends from the base and terminates in a shoulder 44 for a sprung engagement of the component 1 against an inner surface 55 of the dashboard 54. A hook 80 on clip 75 engages a bias hole 52 in front part 4 when the clip is being affixed to the side of the component for pretensioning the ramp section 40 to enhance the sprung engagement. The clip has an alignment surface 89 which is dynamically aligned with respect to a reference surface 22 in the front part 4 of the component while the clip is being affixed to the component. The tension pulls the alignment surface 89 forward against a surface 22 of the component 1 to align the shoulder 44 with respect to the front 4 of the component.

13 Claims, 4 Drawing Sheets

SELF-ALIGNED RETAINING CLIP FOR AUTOMOTIVE COMPONENTS

BACKGROUND OF THE INVENTION

The present invention relates to a retaining clip, and in particular to a clip that may be used to mount a component through an aperture in a motor vehicle dashboard.

Components such as car radios, radio-cassette players, graphic equalizers, clocks and trip computers are usually mounted into a motor vehicle dashboard through an aperture in the front of the dashboard. Generally, the component will have a bezel, which may be removable, to cover over any gap between the sides of the component and the aperture.

In one known arrangement, a component slots into a set of rails that extend back from the front surface of dashboard. This arrangement provides good alignment between the front face of the dashboard and the component and bezel, but the set of rails is relatively expensive to provide.

In another known arrangement, a component has attached to one or more sides a clip which is sprung when the component slots through the aperture, and which presses and seats against an inside surface of the dashboard to retain the bezel against the dashboard. This arrangement is more cost effective than rails, but close dimensional tolerances must be maintained in the component, clip and dashboard to ensure that the clip seats properly. If the location of the clip is out of tolerance with the dashboard, then the bezel may not conceal the aperture properly, or the component may not be retained securely within the dashboard.

According to the invention, there is provided a spring clip for retaining and aligning a component within an aperture in a motor vehicle dashboard, comprising a base with means for affixing the clip to a side of the component, a ramp section with a shoulder for a sprung engagement of the component against an inner surface of the dashboard, means for pretensioning the ramp section to enhance the sprung engagement, wherein the clip has an alignment surface and the means for pretensioning the ramp section pulls the alignment surface forward against a reference surface of the component to align the shoulder with respect to the front of the component when the clip is being affixed to the side of the component. The means for pretensioning the spring clip may comprise a screw or bolt which secures the base to the side of the component.

The term side of the component herein includes any sides adjacent to the front of the component as viewed mounted in a dashboard, that is, left and right sides, and well as top and bottom sides.

The ramp section will usually extend from the base and towards a front part of the component, tapering away from the side of the component to terminate in the shoulder. The shoulder may then have a retention surface which tapers towards the side of the component and which in use is adapted to retain and align the component with the dashboard.

The alignment surface may be provided in a fixed relationship with respect to the retention surface, for example, being connected directly to the retention surface through the grip feature.

In a preferred embodiment of the invention, the means for pretensioning the ramp section comprises a grip section with a finger, the finger being adapted to engage with a tensioning feature in the front part which in use bends the ramp in towards the side of the component when the base is affixed to the side of the component in order to tension outwardly the ramp section, the finger having a shape which under the action of the outwards tension engages with the tensioning feature in such a way as to pull the alignment surface against the reference surface to align the retention surface with respect to the front part.

For example, as the base is being bolted to the side of the component but before the bolt secures the base to the side, the pretension in the spring clip may cause the alignment surface to seat against the reference surface. The bolt may then be further tightened to secure the base and hence the clip in aligned engagement with the side of the component. The separation or orientation of the retention surface with respect to the front part of the component is then self-aligning under the spring action of the spring clip. The spring clip is therefore dynamically seated against and aligned with the reference surface of the front part of the component.

The grip section preferably extends from the ramp section via the shoulder, and may extend from the shoulder substantially parallel to and behind the reference surface. The grip section could, however, extend from another point of the ramp section that does not include the shoulder.

The alignment surface may be provided on the grip section. This is particularly advantageous when the grip section extends from the shoulder, because then the relative spacing between and orientation of the alignment surface and the retention surface may be closely dimensionally toleranced.

The alignment surface may be one or more dimples raised above a surrounding surface. Since the clip may be made from punched and pressed sheet steel, the alignment surfaces may advantageously be such a feature pressed into the sheet steel.

Because of the relatively modest tensions needed for a sprung clip, the alignment surfaces need not be in line with the finger in the direction of the outwards tension. For example, the alignment surface may be laterally offset from the finger in a direction transverse to the outwards tension.

The finger preferably has some feature such as a hook which can engage with the tensioning feature to impart the forces required to dynamically align the spring clip with respect to the component.

In a preferred embodiment of the invention, the spring clip has a base which is centrally provided between two adjacent ramp sections. The ramp sections may then extend from opposite rear corners of the base. Using two ramp sections allows the retention surfaces to be extended across a larger area, and so improve the connection between the component and the dashboard. The ramp sections may then also be connected by a transverse brace which extends between the ramp sections.

Also in a preferred embodiment, the ramp sections terminate in two shoulders each of which has a retention surface, the pair of retention surfaces leading to a U-shaped grip section which connects the shoulders together again.

Preferably, the finger is provided centrally on the grip section.

Also according to the invention, there is provided a component for mounting through an aperture in a motor vehicle dashboard, in which the component has a spring clip comprising a base with means for affixing the clip to a side of the component, a ramp section with a shoulder for a sprung engagement of the component against an inner surface of the dashboard, means for pretensioning the ramp section to enhance the sprung engagement, wherein the clip has an alignment surface and the means for pretensioning the ramp section pulls the alignment surface forward against a reference surface of the component to align the shoulder with respect to the front of the component when the clip is being affixed to the side of the component.

The front part of the component may be a front panel extending substantially across the front of the component. The panel may, of course, be discontinuous, for example having an aperture therethrough for a display.

The tensioning feature may advantageously be an aperture in the front panel, in which case the finger may be a hook which extends through the aperture to engage with the front face of the front panel. The hook will extend through the aperture curved in an outwards direction, that is a direction at least partly along the direction of the force from the outwardly directed tension.

The reference face may be a rear face of the front panel. The engagement between the hook and the front of the panel will then pull the alignment surface towards the rear face of the panel when the ramp section is tensioned by connecting the spring clip to the side of the component.

The alignment surface may then advantageously be pulled against the rear reference face of the front panel. This will align the clip in the direction transverse to the front panel, which will normally also be the direction transverse to the dashboard.

In most cases, the front part of the component will have a flange which is adapted to contact a front face of the dashboard to provide a restoring force for the sprung engagement. It would be possible, however, for the ramp section and/or the shoulder to have a profiled retention surface which would seat the spring clip with respect to a another feature within the dashboard.

It is particularly advantageous, however, if the flange is the front plate, because then the rear reference face of the front plate will seat against the outside of the dashboard. When the spring clip provides an inwards sprung force against an inside surface of the dashboard, the front plate may then provide the restoring force so that the clip keeps the component seated in the aperture.

The distance from the retention surface of the spring clip to the front of the component, for example a front part covered over by a bezel, will then depend mainly on tolerances in the clip between the alignment surfaces and the retention surfaces, rather than tolerances in the side and front surfaces of the component. Tolerances can more easily be maintained within a single item such as the spring clip, than between a number of items assembled in a nondynamic and non-self-aligning manner.

The manufacturing dimensional tolerance of the clip and/or of the component may therefore be relaxed, which may save cost. Alternatively, since the thickness of the dashboard will also have some allowable tolerance, this may be relaxed in order to take advantage of the improved alignment between the clip and the component.

In general, a component will have two or more spring clips, preferably on opposite sides of the component. For example, motor vehicle radios conventionally have spring clips on the left and right sides of the component.

BRIEF DESCRIPTION OF THE DRAWINGS

The invention will now be further described by way of example and with reference to the accompanying drawings, in which.

DETAILED DESCRIPTION OF PREFERRED EMBODIMENTS

Figure 1:
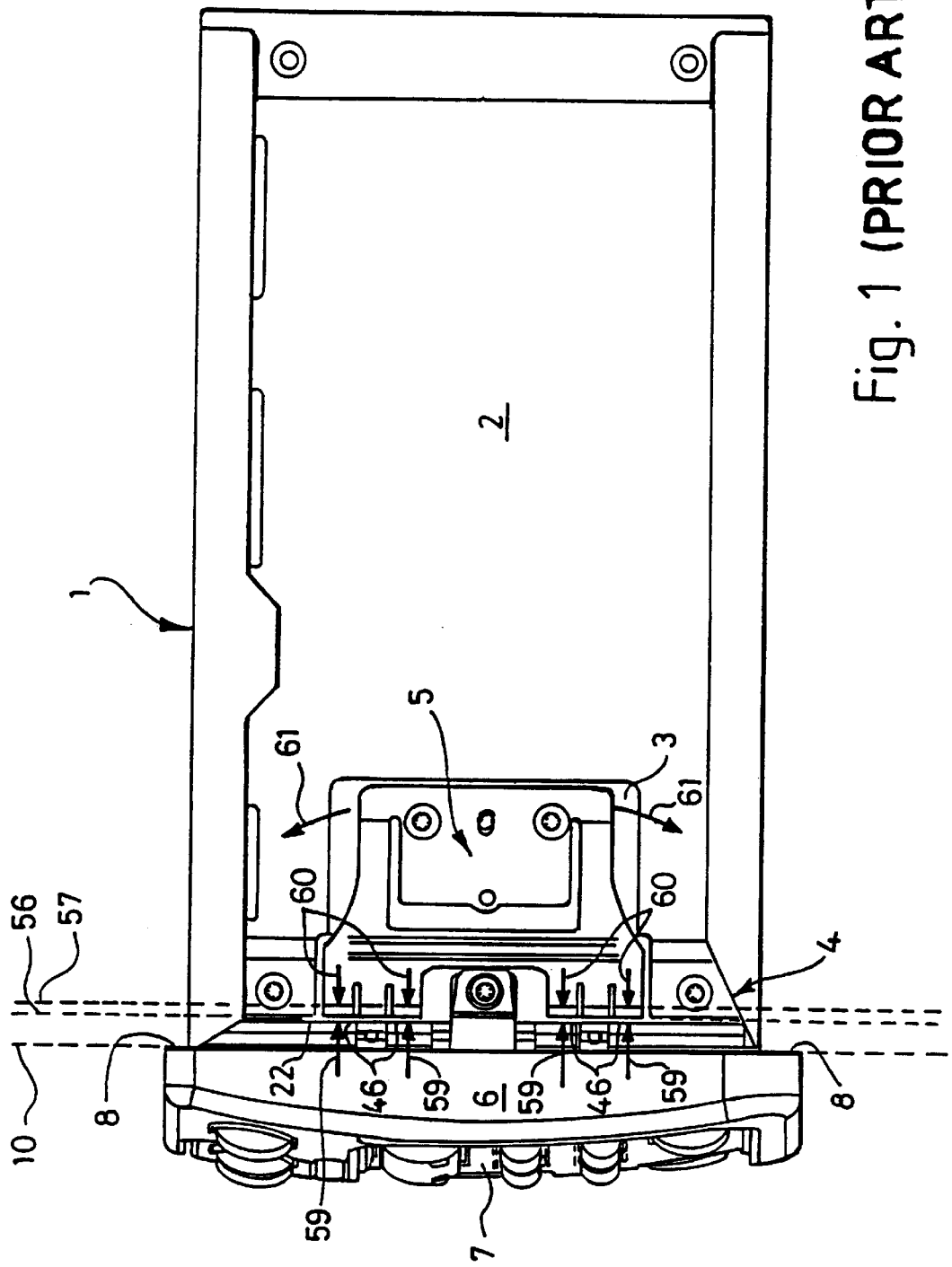
FIG. 1 is a side view of a motor vehicle cassette radio showing a prior art spring clip.

FIG. 1 shows a side view of a cassette radio 1. Visible in the drawing is a right side panel 2 that has a recess 3 towards a front part 4 of the radio in which a prior art spring clip 5 is seated. A similar spring clip is provided on the left side of the radio.

The radio has a front bezel 6 with a control panel 7 on a front face of the bezel. A rear face 8 of the bezel extends beyond the sides of the radio so that when the radio 1 is mounted in an aperture of a motor vehicle dashboard (not shown), the bezel overlaps any gap between the aperture and the radio. When the radio is correctly mounted in the dashboard, the rear face 8 of the bezel 6 should sit against the dashboard. The correct position of an outer dashboard surface relative to the radio is indicated in the drawing by the dashed line designated by the numeral 10.

Figure 2:
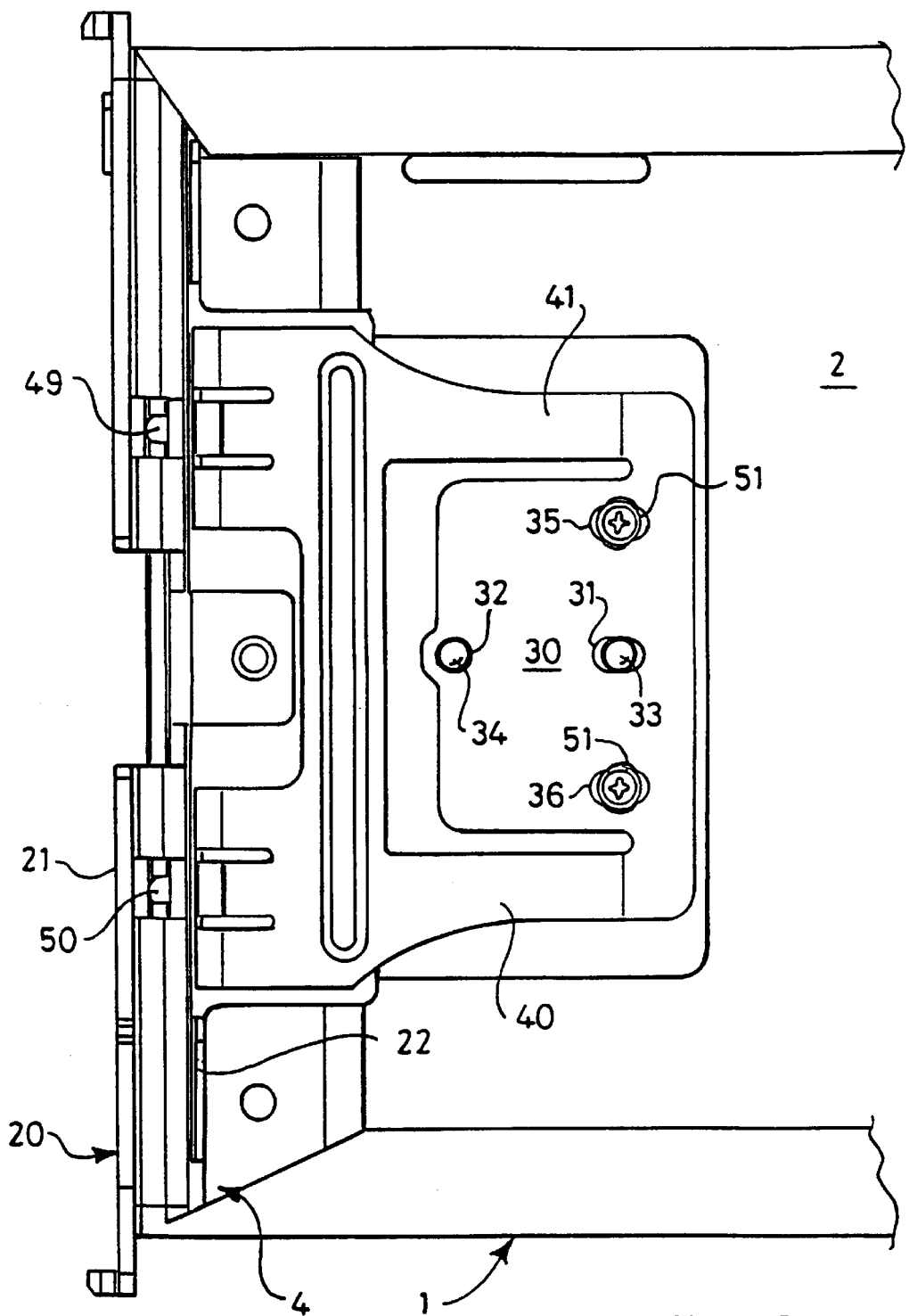
FIG. 2 is an enlarged fragmentary view of a front part of the prior art cassette radio of FIG. 1.

Referring now also to FIG. 2, which shows the radio with the bezel 6 removed, the front part 4 of the radio has a front plate 20 with a front face 21 and a rear face 22. Although not shown, the front plate 20 extends over most of the front part 4 of the radio with cut-outs for such features as a display, buttons and a cassette door.

Figure 3:
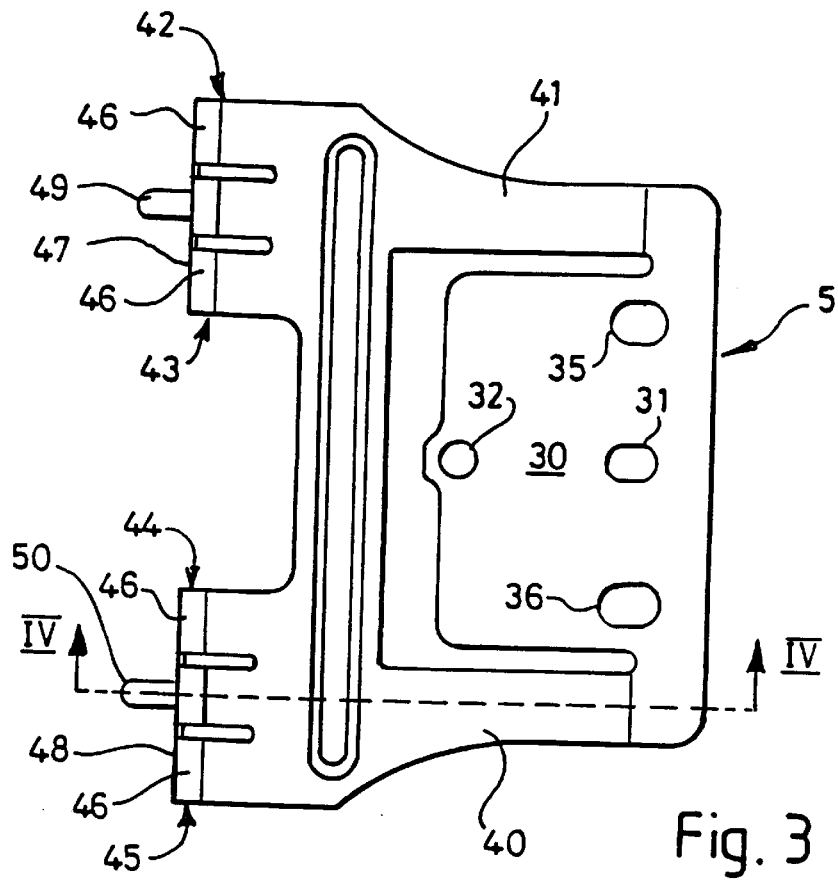
FIG. 3 is a top plan view of the prior art spring clip of FIG. 2.

FIG. 3 shows the prior art spring clip 5 in more detail. The clip has a central base section 30 which has four apertures, two of which 31,32 are on a center line of the clip and which locate with studs 33,34 pressed into the side 2 of the radio. The other two apertures 35,36 are to the sides of the base 30 and receive screws 51 which secure the base of the clip to the side of the radio. The apertures have a certain clearance for the studs and screws in order to accommodate manufacturing tolerances in the spring clip and the side and front parts of the radio.

Figure 4:
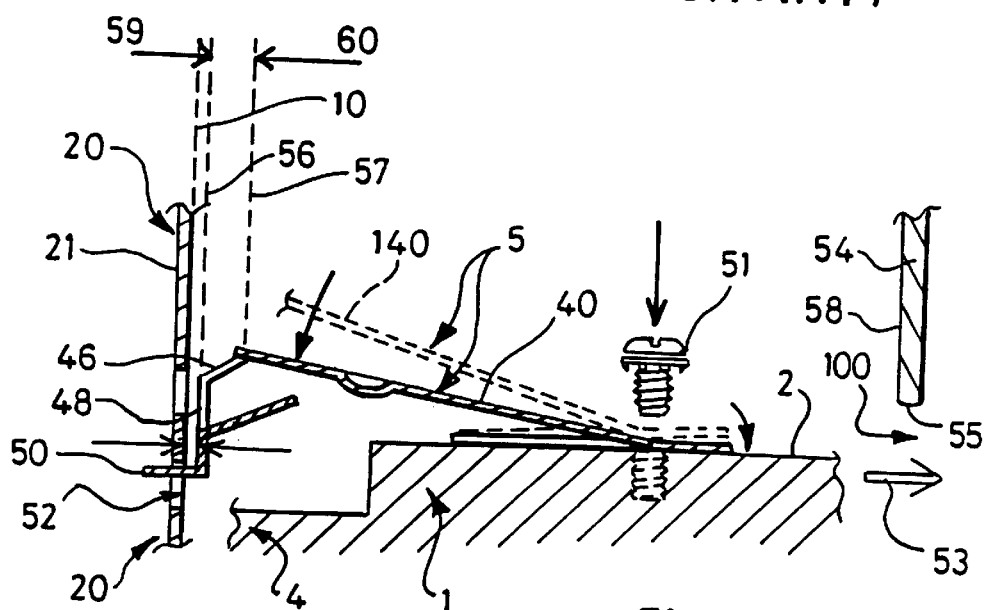
FIG. 4 is a schematic cross-section view of the prior art spring clip of FIG. 3 taken through the line IV—IV, showing the spring clip attached to a side of the cassette radio.

The spring action of the prior art clip 5 may be appreciated from FIG. 4, which shows the spring clip 5 in cross section with a schematically drawn cross section of the radio 1 and front plate 20. The clip has ramp sections 40,41 either side of the base 30. These taper forwards and away from the side 2 towards the front part 4 of the radio. The ramp sections each terminate in two shoulder regions 42,43 and 44,45, each of which has a retention surface 46 which slopes at about 45° back towards the plane of the side 2 of the radio. A grip section 47,48 extends downwards substantially parallel to the rear face 22 of the front plate 20. In the central lower edge of the grip section, a flat straight finger 49,50 extends forwards from the grip section. Each finger extends through a hole 52 in the front plate 20.

Before the spring clip is mounted to the side of the radio, the angle between the ramp sections 40,41 and the base section 30 is about 20°, as shown by a ramp section 140 shown in FIG. 4 in phantom.

When the spring clip 5 is screwed down to the side 2 by screws 51, this angle is compressed to about 10°, which stresses the ramp sections 40,41 so that they are biased outwards. The outwards biasing keeps the fingers 49,50 pressed outwards against the side of the holes 52.

Once the clips on opposite sides of the radio have been mounted to radio, the front bezel 6 may be attached, and the radio inserted into an aperture 100 in a dashboard 54, as illustrated in FIG. 4 by an arrow designated 53.

The aperture 100 in the dashboard 54 will have an inner edge 55 which will ride up the ramp sections 40,41, pressing these inwards until the dashboard inner edge 55 seats into a sprung engagement with the retention surfaces 46.

Referring now to FIGS. 1 and 4, two dashed lines 56,57 show the forward and rearward limits of the retention surfaces 46. The positions of these retention surfaces 46 are illustrated in the nominal or ideal location between pairs of arrows designated 59,60. For the bezel rear surface 8 to seat correctly against a front face 58 of the dashboard 54, the spring clip 5 must be positioned on the side 2 of the radio so that all four spring clip retention surfaces 46 contact the inner edge 55 of the dashboard 54. Whether or not the retention surfaces are correctly positioned depends on two factors: a number of dimensional tolerances must be met, in the spring clip 5, the radio 1, and the dashboard 54; and the clip must be correctly mounted to the side of the radio.

It has been found in a production environment, that the first of these factors places undue burdens on the specification of the dashboard, adding to its manufacturing cost. For example, the dashboard may need a precision molded polycarbonate or an aluminum frame. The second of these factors may not always be met, for example because the clip is able to twist while it is being screwed to the side of the radio, as indicated by the arrows designated 61 in FIG. 1. The tendency to twist will be greater when just one of the two off-central screws 51 are tightened at a time, because of the initially uneven compression of the ramp sections 40,41.

Figure 5:
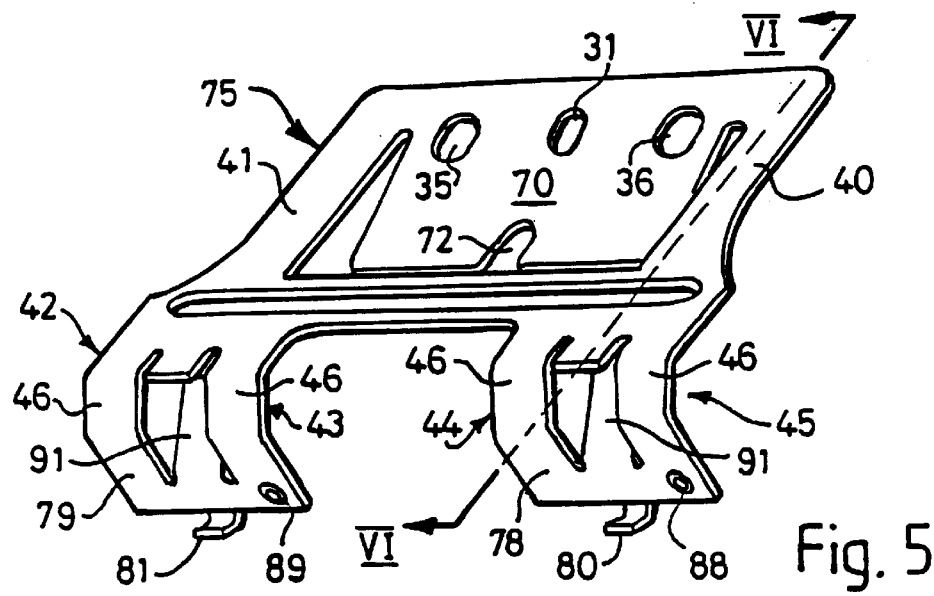
FIG. 5 is a perspective view of a spring clip according to the invention.
Figure 6:
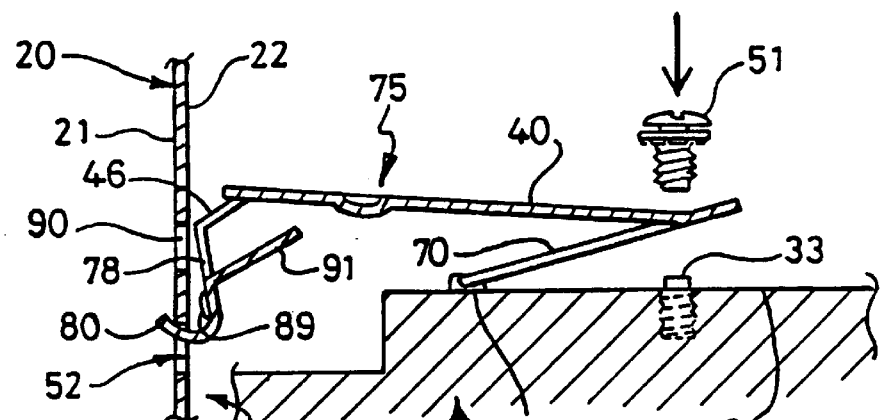
FIG. 6 is a schematic cross-section view of the spring clip of FIG. 5 taken through the line VI—VI, showing the spring clip prior to attaching the clip to the side of the cassette radio.
Figure 7:
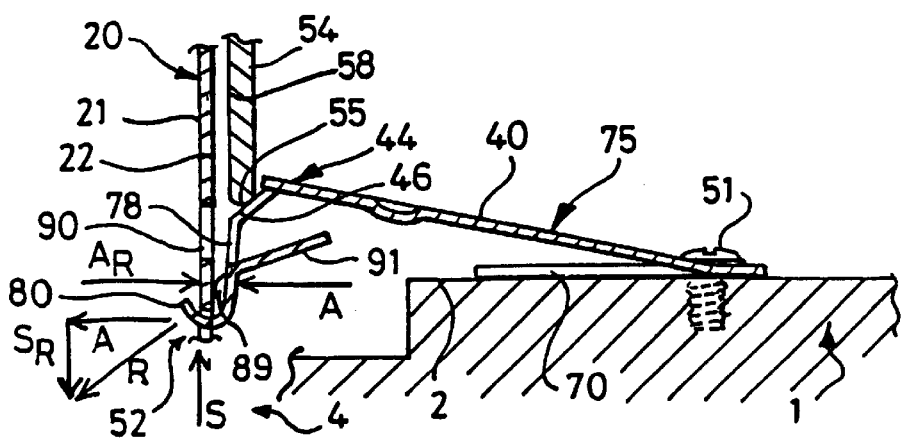
FIG. 7 is a view of the spring clip of FIG. 6, showing the spring clip after attaching the clip to the side of the cassette radio.

FIGS. 5, 6 and 7 show a spring clip 75 according to the invention which is dynamically self-aligning with respect to the front plate 20 of the radio 1. This clip 75 has three differences over the prior art clip, having a modified base section 70, grip sections 78,79, and fingers 80,81 in the shape of upwardly turned hooks.

The significance of the differences are apparent from considering FIGS. 6 and 7, which show how the spring clip 75 is mounted to the side 2 of the radio 1. For the sake of clarity, the front part 4 of the radio, including the front plate is again drawn schematically. The hooked fingers 80,81 are first inserted through the holes 52 in the front plate 20.

The grips 78,79 each have an alignment surface which is a dimple 88,89 protruding from the surrounding surface of the grip.

The front part of the base has a slot 72, instead of the hole 32 of the prior art clip. This slot is aligned with the forward stud 34 in the side 2 of the radio. The base plate 70 is then screwed down to the radio side. As this happens, the angle between the ramp sections 40,41 and the base section 75 is compressed as described above. The hooked fingers 80,81 are then forced upwards in the holes 52 against the front plate 20. Because of the upwards angle of the fingers, the spring clip 75 is pulled forwards thus engaging the dimples 88,89 against the rear face 22 of the front plate 20.

Even though only one screw 51 may be tightened at a time, both dimples 88,89 will be brought forward to seat against the front plate rear face 22, thus dynamically seating and aligning the spring clip with respect to the front plate 20, and hence to the front part 4 of the radio 1. The rear face therefore acts as a reference surface for aligning the spring clip. The clip will therefore be aligned in a longitudinal direction as defined by the direction the radio is inserted into the dashboard.

During this action the slot 72 in the base will slide forward and align the clip transversely with the stud 34. The clip is therefore aligned both in transverse and longitudinal directions.

The relevant forces involved in this action are indicated in FIG. 7 by vectors S, R, A, $S_R$ and $A_R$. S is the outwards force produced by the relative compression between the ramp sections 40,41 and the base section 70. Force S is the pretensioning force generated when the spring clip is first being screwed down to the side of the radio. Considering the situation before the screws 51 are tightened to secure the clip to the radio, and before insertion of the radio into the dashboard, the force S will act through the hooked fingers 80,81 against the edge of the front plate hole 52. The front plate will supply a restoring force R which is directed normal to the upward curving surface of the fingers. The sum of S and R produces a resultant force A directed forwards which pulls the spring clip 75 forwards until the dimples 88,89 contact the rear face 22 of the front plate 20. The front plate then supplies a restoring force $A_R$ to the dimples to seat the spring clip in alignment. This aligns both the separation and orientation of the retaining surfaces 46 with respect to the front part 4 of the radio, so that the inner edge 55 of the dashboard 54 may be correctly seated on the retaining surfaces 46.

The restoring force $A_R$ cancels the resultant force A leaving a net restoring force $S_R$ which cancels the pretension force S.

Once the radio is inserted in the dashboard, the inner edge 55 of the dashboard will normally compress the clip further so that the clip presses outwards against the dashboard inner edge 55, rather than the radio front panel 20.

After the radio is seated in the dashboard aperture 100, the clip may be disengaged from the dashboard in a known way, by inserting a screwdriver or other such blade into an aperture 90 in the front plate 20 to depress a tag 91 and pull the retention surfaces 46 inwards to release the shoulders 42,43,44,45 of the spring clip 75 from the inner edge 55 of the dashboard 54.

A spring clip according to the invention may be used to mount a wide variety of components in an aperture in a surrounding surface. Since the clip dynamically aligns itself with the front part of the component when it is screwed or otherwise connected to a side of the component, the component will be more reliably mounted as well as more reproducibly mounted with respect to the direction of insertion through the aperture. Such a clip may be advantageously employed in a production environment to reduce some of the problems of cost associated with tight dimensional tolerances and/or mismounted clips. The invention is therefore of general applicability to the spring clip mounting of components within a surrounding surface, and not restricted to the mounting of cassette radios and other such units in a motor vehicle dashboard.

What is claimed is:

1. A component for being retained and aligned within an aperture in a motor vehicle dashboard, comprising:

a front plate having a rear face for contacting an outer surface of said dashboard when said component is retained therein, said rear face providing a reference surface;

a side surface received through said aperture during mounting of said component to said dashboard; and a spring clip mounted to said side surface, said spring clip comprising:

a base having a mounting section for affixing said clip to said side surface of said component;

a ramp section with a shoulder for a sprung engagement of said component against an inner surface of the dashboard;

an alignment surface having a fixed relationship with said shoulder; and attachment means for joining said mounting section to said side surface of said component and simultaneously pretensioning said ramp section to enhance the sprung engagement and pulling said alignment surface forward against said reference surface of said front plate to align said shoulder with respect to said front plate.

2. The component of claim 1 wherein said ramp section extends from said base and towards said front plate of said component, tapering away from said side surface to terminate in said shoulder.

3. The component of claim 2 wherein said shoulder has a retention surface which tapers towards said side surface and which in use is adapted to retain and align said component with said dashboard.

4. The component of claim 3 wherein said alignment surface is provided in a fixed relationship with respect to said retention surface.

5. The component of claim 4 wherein said clip further comprises a grip section with a finger and said front plate further comprises a bias hole, said finger engaging said bias hole to bend said ramp section in towards said side surface when said base is affixed to said side surface in order to tension said ramp section, said finger having a shape which under the action of said tension engages with said bias hole in such a way as to pull said alignment surface against said reference surface to align said retention surface with respect to said front plate.

6. The component of claim 5 wherein said grip section extends from said shoulder substantially parallel to and behind said reference surface.

7. The component of claim 6 wherein said alignment surface is provided on said grip section.

8. The component of claim 7 wherein said alignment surface is laterally offset from said finger.

9. The component of claim 8 wherein said finger has a hook which engages with said bias hole.

10. The component of claim 9 in which said ramp section terminates in two shoulders each of which has a respective retention surface.

11. The component of claim 10 in which said finger is provided centrally on said grip section.

12. The component of claim 1 in which said alignment surface is comprised of a dimple raised above a surrounding surface.

13. The component of claim 1 wherein said base is centrally provided between two adjacent ramp sections.

* * * * *